Patented Jan. 9, 1945

2,367,057

UNITED STATES PATENT OFFICE 2,367,057

SULPHONAMIDE DERIVATIVES OF 4-AMINO-3-METHYL FURAZAN AND METHODS FOR THEIR PRODUCTION

Richard O. Roblin, Jr., Old Greenwich, and George W. Anderson, Stamford, Conn., assignors to American Cyanamid Company, New York, N. Y., a corporation of Maine No Drawing. Application July 31, 1942, Serial No. 453,103

9 Claims. (Cl. 260—239.6)

This invention relates to a new class of chemical compounds and methods for their preparation. More particularly it relates to the sulphonamide derivatives of 4-amino-3-methyl furazan.

This new class of chemical compounds may be represented by the following general formula:

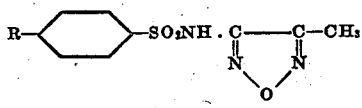

in which R represents an amino group or a group hydrolyzable to an amino group, including acyl groups of carboxylic acids.

Some of the compounds of this invention have bactericidal properties and hence may be used for that purpose. They may also be used as intermediates for the preparation of other compounds, such as pharmaceuticals and particularly azo dyestuffs.

The compounds of the present invention, in general, may be prepared by reacting a p-acylbenzenesulphonyl halide with 4-amino-3-methyl furazan and such reaction products can then be converted into the compounds of the general formula in which R is an amino group by hydrolysis. Preferably the reaction between 4-amino-3-methyl furazan and the sulphonyl halide is carried out in a medium comprising an organic liquid, such as acetone, isopropyl alcohol, tertiary butyl alcohol, dioxane, or the like. In the reaction a hydrogen halide is liberated, and it may be desirable to provide a basic reaction medium which will react with the hydrogen halide evolved. This may be effected by carrying the reaction out in one of the organic solvents mentioned heretofore along with the addition of an excess of sodium hydroxide or other alkali metal hydroxide. Preferably the reaction is carried out in the presence of a basic reaction medium, such as pyridine, trimethylamine, or quinoline, in which case it is not necessary to add an alkali hydroxide.

Our invention will be more fully illustrated in conjunction with the following specific examples. It should be understood, however, that the examples are given by way of illustration only and the invention is not to be limited by the details set forth therein. Parts are by weight except in the case of liquids which are expressed in parts by volume.

Example 1

3 - methyl - 4 - acetylsulphanilamidofurazan is prepared by adding 4.66 parts of acetylsulphanilyl chloride in portions to a solution of 2.00 parts of 4-amino-3-methyl furazan in 5 parts of dry pyridine. The resulting solution is heated at 70° to 85° C. for half an hour, cooled and diluted with 50 parts of water. The sticky precipitate which forms is removed. After further dilution of the pyridine solution with water, a solid precipitate of the furazan forms. This is filtered off and purified by recrystallization from isopropanol.

Example 2

3-methyl-4-sulphanilamidofurazan is prepared by refluxing 0.58 part of the acetyl derivative, of Example 1, with 1.9 parts by volume of concentrated hydrochloric acid plus 3.8 parts of water for about five minutes after all of the solid has dissolved. The solution is cooled and neutralized to a maximum precipitation of the desired compound. This is filtered off and purified by recrystallization from water.

In Example 1 above p-acetylaminobenzenesulphonyl chloride was used in carrying out the reaction. The acetyl compound is preferred because of its cheapness and availability. However, it is to be understood that p-acyl derivatives of any organic carboxylic acid may be used, including those such as the propionyl, butyryl, benzoyl, nicotinyl, and the like. Similarly, instead of the p-acetylaminobenzenesulphonyl chloride, the corresponding acetylaminobenzenesulphonyl bromide may be used.

When desired, the alkali metal, alkaline earth metal or other metal salts of 3-methyl-4-sulphanilamidofurazan may be prepared in accordance with the procedures normally employed for preparing salts of sulphonamides. The alkali metal and alkaline earth metal salts, for example, may be prepared by direct treatment with the appropriate alkali metal or alkaline earth metal hydroxide. The alkali metals may then, if desired, be converted into salts of heavy metals, such as iron, copper, gold, etc. by treatment with water-soluble inorganic salts of the appropriate metal.

It is obvious that the above description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

What we claim is:

1. Compounds of the group consisting of those represented by the following general formula and salts thereof:

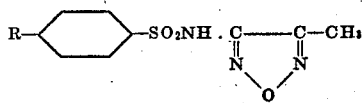

in which R is a member of the group consisting of amino radicals and radicals hydrolyzable to an amino group.

2. The compound 3-methyl-4-acetylsulphanilamidofurazan.

3. The compound 3-methyl-4-sulphanilamidofurazan.

4. The process which comprises reacting 4-amino-3-methyl furazan with a p-acylaminobenzenesulphonyl halide to give a 3-methyl-4-acylsulphanilamidofurazan.

5. The process which comprises reacting 4-amino-3-methyl furazan with a p-acylaminobenzenesulphonyl halide to give a 3-methyl-4-acylsulphanilamidofurazan, and subsequently hydrolyzing to give 3-methyl-4-sulphanilamidofurazan.

6. The process which comprises reacting 4-amino-3-methyl furazan with p-acetylaminobenzenesulphonyl chloride to give 3-methyl-4-acetylsulphanilamidofurazan.

7. The process which comprises reacting 4-amino-3-methyl furazan with p-acetylaminobenzenesulphonyl chloride to give a 3-methyl-4-acetylsulphanilamidofurazan, and subsequently hydrolyzing to give 3-methyl-4-sulphanilamidofurazan.

8. The process for producing 3-methyl-4-sulphanilamidofurazan which comprises hydrolyzing a 3-methyl-4-acylsulphanilamidofurazan.

9. The process for producing 3-methyl-4-sulphanilamidofurazan which comprises hydrolyzing a 3-methyl-4-acetylsulphanilamidofurazan.

RICHARD O. ROBLIN, Jr.
GEORGE W. ANDERSON.